Sept. 24, 1940.  G. C. PATRICK ET AL  2,215,619
FENDER SKIRT CLAMPING MECHANISM
Filed Dec. 24, 1937  3 Sheets-Sheet 1
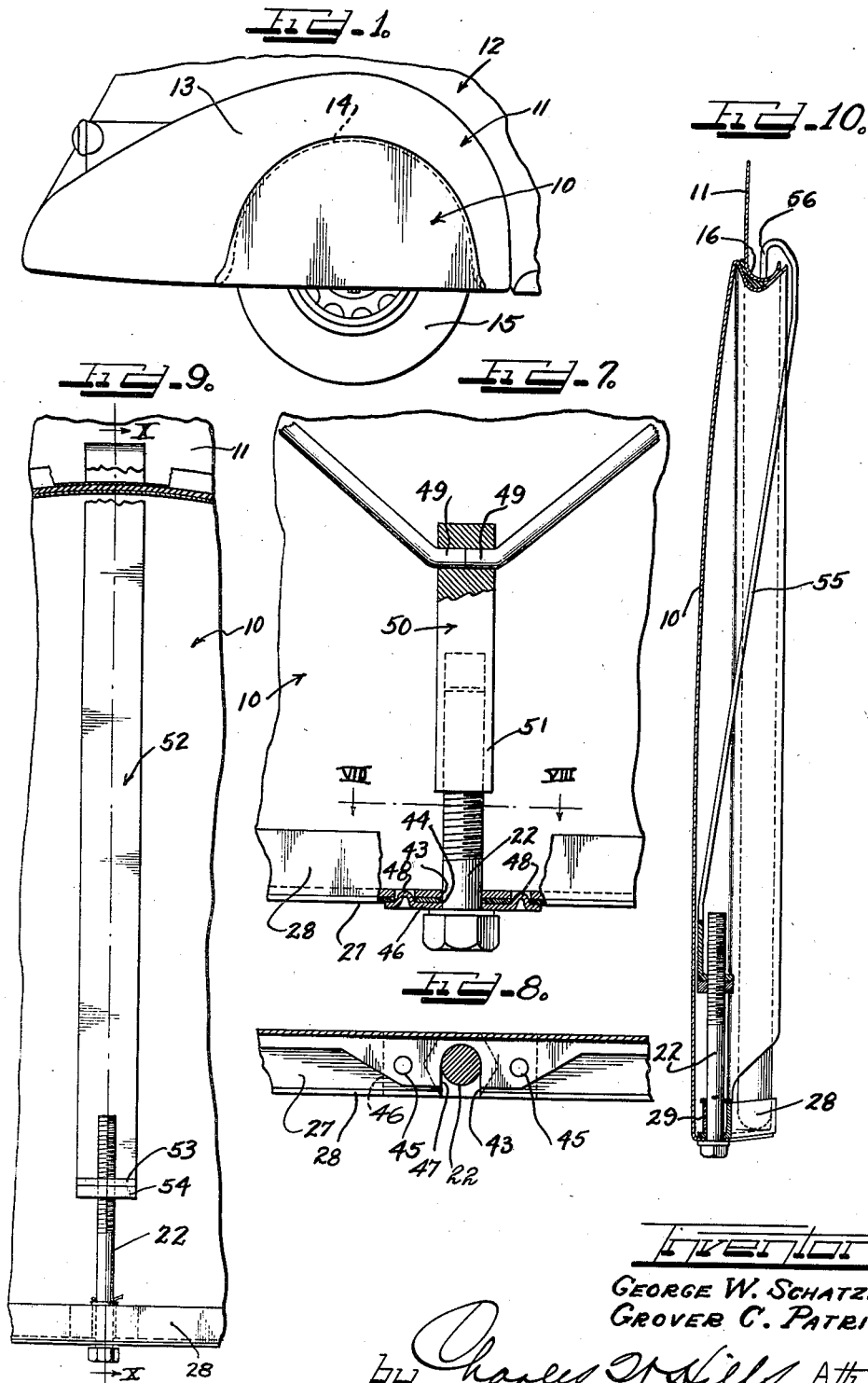
Inventors
GEORGE W. SCHATZMAN.
GROVER C. PATRICK.

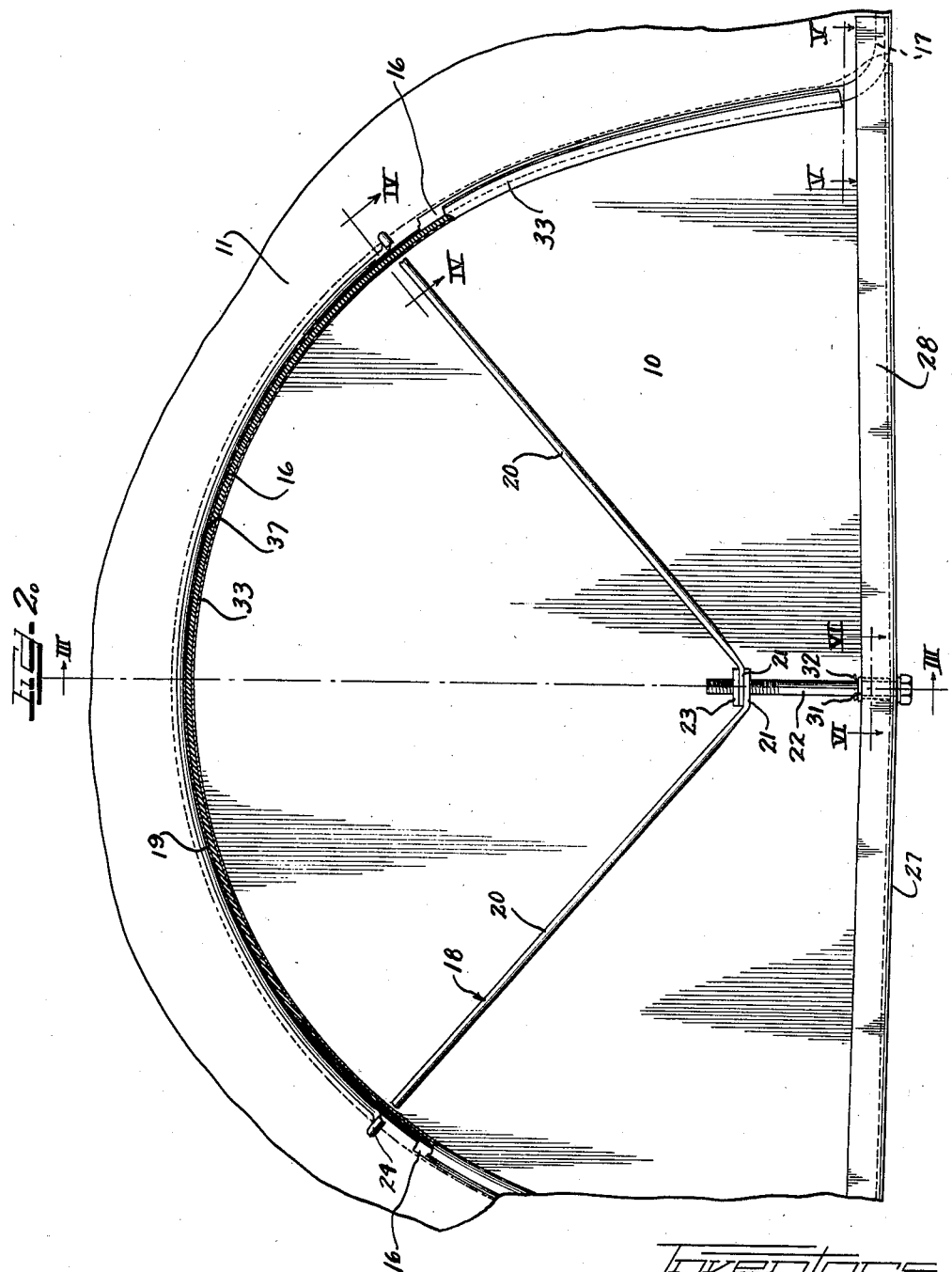

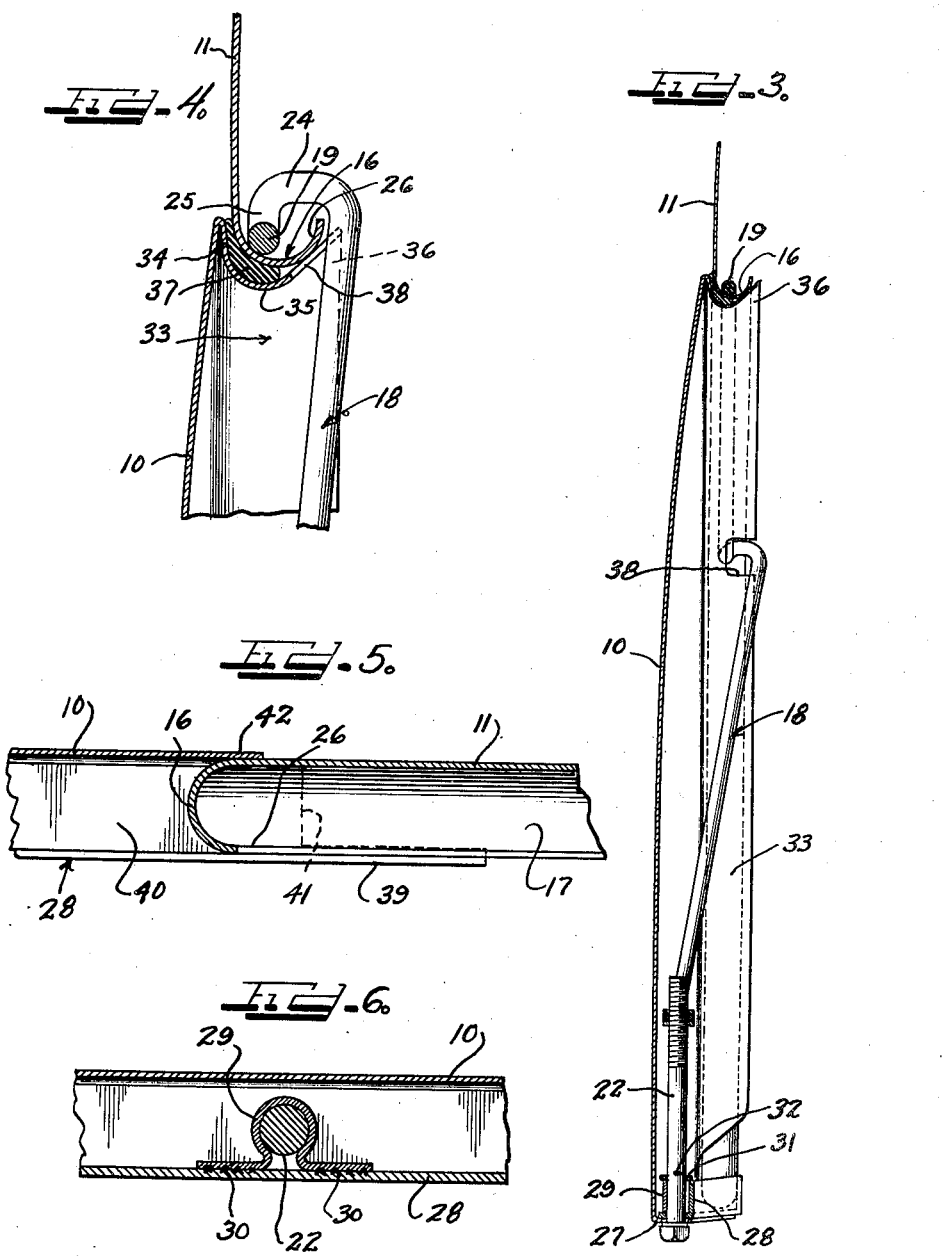

Patented Sept. 24, 1940

2,215,619

UNITED STATES PATENT OFFICE 2,215,619

FENDER SKIRT CLAMPING MECHANISM

Grover C. Patrick and George W. Schatzman, Detroit, Mich., assignors, by mesne assignments, to Houdaille-Hershey Corporation, Detroit, Mich., a corporation of Michigan Application December 24, 1937, Serial No. 181,482

8 Claims. (Cl. 280—153)

This invention relates to ornamental fender skirts and more particularly to a novel means for securing an ornamental fender skirt to a vehicle fender.

In designing ornamental fender skirts or shields of the type which are adapted to cover the usual wheel access opening in a vehicle fender, it is important that the means which is employed to secure the fender skirt in desired position be simple and quick to operate both in the assembly of the fender skirt on the vehicle fender and in removing it therefrom. It must also possess the desired degree of ruggedness when in use and be substantially free from vibration and noise. As the term "fender skirt" shall hereinafter be employed, it refers to any member which is to be secured to a fender or other portion of a vehicle body for the purpose of covering the opening in the fender for the vehicle body which is provided for access to or removal of a vehicle wheel. Furthermore, as the term "fender" shall hereinafter be employed, it refers to any form of wheel fender in its broad sense, whether such fender be separate from the vehicle body part, partially separate from the vehicle body, or actually an integral part of the vehicle body, and whether or not it projects downward away from the principal body portion of the vehicle.

It is an object of this invention to provide a novel ornamental fender skirt and fender skirt clamping mechanism which possesses the above highly desirable characteristics.

It is another object of this invention to provide an improved fender skirt and fender skirt clamping mechanism which is economical to manufacture and which is rugged and reliable in use.

It is a further object of this invention to provide novel means for supporting the fender skirt and for urging the fender skirt upwardly in the plane of the fender opening.

Another and further object of this invention is to provide a novel clamping mechanism for holding a fender skirt in tight engagement with the opening defining edge of a vehicle fender and to provide novel operating mechanism for rendering the clamping mechanism effective.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1 is a side elevational view of the rear part of an automobile having the usual form of vehicle fender and equipped with an ornamental fender skirt constructed in accordance with the teachings of the present invention;

Figure 2 is a rear elevational view of the fender skirt and fender skirt clamping mechanism;

Figure 3 is a cross-sectional, side elevational view of the fender skirt and clamping mechanism taken along the line III—III of Figure 2;

Figure 4 is an enlarged fragmentary view, partly in cross-section, taken along the line IV—IV of Figure 2;

Figure 5 is an enlarged fragmentary cross-sectional view of a lower corner of the fender skirt taken along the line V—V of Figure 2;

Figure 6 is an enlarged cross-sectional plan view of the fender skirt and clamping mechanism taken along the line VI—VI of Figure 2;

Figure 7 is an enlarged fragmentary rear view of a modified form of clamping mechanism;

Figure 8 is a cross-sectional plan view of the clamping mechanism taken along the line VIII—VIII of Figure 7;

Figure 9 is a rear elevational view partly in cross-section of a different form of clamping mechanism; and Figure 10 is a side elevational view partly in cross-section taken along the line X—X of Figure 9.

In Figure 1 of the drawings, I have illustrated a fender skirt 10 constructed in accordance with the teachings of the present invention assembled on a rear fender 11 of an automobile 12. The fender 11 is shown as being of the high crown type having a downwardly extending outer side wall portion 13, the latter being provided with the usual opening 14, which affords access to the vehicle wheel 15 and which permits ready removal of the wheel 15 in an axial direction. The ornamental fender skirt 10 is disposed over the opening 14 in such a manner as to substantially close the opening and to harmonize with the outer side wall portion 13 of the fender 11. The outer surface of the fender skirt 10 may, of course, be substantially smooth, as is illustrated in the drawings, or it may assume any other desired configuration for the purpose of ornamentation.

As shown in Figure 2, the outer marginal edge of the fender 11 which defines the opening 14 is underturned as at 16, while the outer marginal edges that define the base of the fender 11 are underturned as at 17. As is well known to those skilled in the art, fenders of the high crown type are generally provided with these underturned edge portions to increase the rigidity of the fender. As will presently be explained, advantage is taken of this feature to assemble and secure the ornamental fender skirt over the fender opening.

Referring now to Figures 2 to 6, inclusive, the clamping mechanism by which the fender skirt 10 is detachably secured to the vehicle fender 11 will be described. As will readily be seen from a cursory inspection of the various figures of the drawing, a clamping mechanism is provided on the fender skirt 10 which will engage the underturned rolled edge 16 of the fender and pull the fender skirt 10 up into tight engagement therewith. This clamping mechanism comprises a steel rod 18 having an intermediate arcuate portion 19 and two radially inwardly extending end portions or arms 20, the extreme inner end 21 of the arms 20 are flattened and apertured for the passage therethrough of a clamping bolt 22. The flattened portion 21 of each arm 20 are spot welded together and to a nut 23 which are apertured in coincidence with each other. The nut 23 is arranged to engage the threaded end of the bolt 22 as may be clearly seen in Figures 2 and 3 of the drawings.

In order that the intermediate arcuate portion 19 of the rod 18 may conveniently engage the underturned rolled edge 16 of fender 11, the arms 20 of rod 18 are bent slightly axially inwardly from a true vertical position (see Figure 3). In the vicinity of the junction point of the arms 20 with the intermediate portion 19, the arms 20 are bent axially outwardly as at 24, then radially inwardly for a short distance as at 25 in order that they may extend around the upturned lip 26 of the underturned rolled edge 25 and extend into engagement with the bottom of the channel formed by the rolled edge 16.

In order to increase the rigidity of the fender skirt 10 and in order to provide a suitable mounting structure for the clamping bolt 22, the lower edge of the fender skirt is bent rearwardly at 27 and a reinforcing angle bar 28 which extends clear across the lower edge of the fender skirt 10 is welded or otherwise suitably secured thereto. A strap 29 which is formed to extend around the clamping bolt 22 is welded or otherwise suitably secured to the inner face of the angle iron 28 as at 30. The rearwardly turned bottom edge 27 of the fender skirt 10 and the angle iron 28 are suitably apertured for the reception of the clamping bolt 22, the latter being free to rotate therein. The clamping bolt assembly is completed by passing a washer 31 over the upper end of the clamping bolt 22 and by placing a cotter pin 32 or the like through a suitable aperture in the bolt 22 to prevent the bolt 22 from falling out of its assembled position.

From the above description, it will at once be apparent that by tightening the clamping bolt 22, the fender skirt 10 is urged upwardly into tight engagement with the underturned rolled edge 16 of fender 11. It will also readily be understood that due to the fact that the clamping bolt 22 is held in a relatively fixed vertical position with respect to the fender skirt 10 that upon rotating the bolt 22 in the opposite direction, the intermediate arcuate portion 19 of the clamping rod 20 will be vertically advanced with respect to the fender skirt 10 by a positive action.

In the above paragraph the means by which the fender skirt is supported in a vertical position has been described. It will of course be apparent that additional means must be provided to prevent lateral movement of the fender skirt. One form of means which has been found highly desirable for restraining lateral movement is to provide a channel-like flange portion around the curved edge of the fender skirt which will be seated or nested upon the underturned rolled edge 16 of fender 11. Such a channel shaped flange portion may be conveniently provided by bending the outer marginal edge portion 33 sharply back on itself as at 34 then rolled rearwardly and outwardly as at 35 and 36 respectively. By forming the flange 33 integral with the fender skirt 10, it will readily be appreciated that the manufacturing costs of producing the flange are greatly minimized. In order to substantially reduce rattling and other objectionable noise between the fender skirt 10 and the fender 11, a cushioning strip 37 is disposed along the bottom and forward wall of the channel-like portion of the flange 33.

In order that the bending of the clamping rod 18 from its vertical position may not be excessive, flange 33 is slotted as at 38 at the point where the arms 20 of the clamping rod 18 extend outwardly beyond the edge of the fender skirt 10 into engagement with the underturned rolled edge 16 of the fender 11.

In order to provide a convenient and novel means for centering the fender skirt 10 in the fender opening of the fender 11, the reinforcing angle bar 28 is extended beyond the lower corners of the fender skirt as at 39. The bottom wall 40 of the angle iron 38 is cut away at the ends of the angle iron 38 as at 41 in order that the upward movement of the fender skirt 10 caused by the clamping rod 18 will not be restricted. From a careful inspection of Figure 5 of the drawings, it will be observed that the upstanding wall portion of the reinforcing bar 38 engages the rear face of the upwardly turned lip 26 of the underturned rolled edge 16 of fender 11, while the fender skirt itself engages the front face of the fender 11 as at 42. The cutout portion 41 of angle bar 28 is just sufficient so that when the fender skirt 10 has been moved up into tight engagement with the underturned rolled edge 16 of fender 11 by the clamping rod 18 the lower base edge 17 of the fender will just extend through the slot formed in the angle iron 28 (see Figure 2). It will thus be observed that the fender skirt is centered both in an axial direction and in a direction parallel to the plane of the fender opening.

From the above description, it will readily be seen that I have provided an extraordinarily simple and yet effective ornamental fender skirt and fender skirt clamping mechanism which includes novel means for supporting the fender skirt in a vertical plane, for restricting lateral movement of the fender skirt, and for centering the fender skirt in the fender opening. It will also readily be apparent that the structure readily lends itself to economical manufacturing processes and that it is rugged and reliable in use.

In Figures 7 and 8, I have shown a modified form of my invention which is similar to that described as the preferred embodiment of my invention with the exception of the clamping bolt structure. In the modified structure shown in Figures 7 and 8, the reinforcing angle bar 28 is slotted as at 43 rather than apertured and the rearwardly bent lower edge 27 of the fender skirt 10 is similarly slotted as at 44. In addition to the slots 43 and 44 in angle iron 28 and flange 27 respectively, two apertures 45 are provided, one on either side of the slotted portions 43 and 44.

A rectangular washer 46 is arranged for disposition below the flange portion 27 of fender skirt 10 and is provided with an aperture 47 through which the clamping bolt 22 extends. Rectangular washer 46 is also provided with protuberances 48 which are arranged to extend up into holes 45 of angle bar 28 and flange 27. It will thus be observed that so long as rectangular washer 46 is maintained in tight engagement with the flange 27 the bolt 22 cannot move out of slots 43 and 44. However, when bolt 22 is loosened a sufficient amount to permit the protuberances 48 of the rectangular washer 46 to fall out of holes 45 the bolt 22 may be slid out of slots 43 and 44 carrying the rectangular washer 46 with it. By this arrangement, it will be seen that the clamping mechanism is completely detachable from the fender skirt 10 as well as from the fender 11.

In the form of the invention shown in Figures 7 and 8, a slightly modified arrangement is also provided for the reception of the threaded end of the bolt 22. More particularly, the inner ends 49 of the arms 20 of the clamping rod 18 are secured in the upper end of a hollow threaded stem member 50, the lower end 51 of which is arranged for the reception of the threaded end of the clamping bolt 22. The ends 49 of the clamping rod 18 may be secured to the stem 50 in any suitable manner, such as by aperturing the upper end of the stud member 50 and inserting the ends 49 of the clamping rod 18 therein and welding or otherwise suitably securing them in place.

In the arrangement described above, it will be understood that when the clamping bolt 22 is loosened the entire clamping mechanism becomes separated from the fender skirt 10, that is to say, after the clamping bolt 22 has been loosened a sufficient amount for the protuberances 48 of the rectangular washer 46 to drop out of the holes 25, the fender skirt 10 may be lifted away from the fender 11 leaving the clamping mechanism still hanging on the underturned rolled edge 16 of the fender 11. Thereafter, the clamping mechanism may be lifted off. By making the clamping mechanism detachable with respect to both the fender and the fender skirt, it will readily be understood that the clamping mechanism may be employed on a new fender skirt if the fender skirt becomes damaged or a new clamping mechanism may be applied to an old fender skirt if the clamping mechanism becomes damaged. This greatly reduces the replacement cost of the unit and for that reason is exceedingly desirable as a commercial article.

In Figures 9 and 10 a third embodiment of the present invention is illustrated. In this arrangement, the clamping bolt assembly of the clamping mechanism is substantially similar to that shown in the preferred embodiment of the invention, but in place of the clamping rod therein described, an upright clamping bar 52 is employed in its place. Clamping bar 52 is provided with a lower rearwardly bent end portion 53 to which a threaded nut 54 is welded, the tip portion being suitably apertured for the passage therethrough of the clamping bolt 22. The central portion 55 of the clamping bar 52 is bent slightly rearwardly out of its vertical position for the purpose of permitting the upper end 56 of the bar to be bent around the underturned rolled edge 16 of the fender 11. Clamping bar 52 operates in substantially the same manner as the clamping rod 18 of the preferred embodiment of this invention, to support and secure the fender skirt 10 to the vehicle fender 11.

While I have shown particular embodiments of my invention, it will of course be understood that I do not wish to be limited thereto since modifications may be made and I therefore contemplate by the appended claims to cover all such modifications as fall within the true spirit and scope of my invention.

I claim as my invention:

1. A clamping device for detachably securing a fender skirt to a vehicle fender having an underturned marginal portion which defines the wheel opening comprising a single clamping rod having a curved intermediate portion shaped to be seated in said underturned marginal portion of said fender and radially inwardly extending arms, the inner ends of said arms being welded together and to a threaded locking nut, and a clamping bolt rotatably secured to said skirt having a threaded end for complementary engagement with said nut, whereby the inner ends of said arms may be pulled downwardly and also positively advanced upwardly with respect to said skirt.

2. In an assembly including a fender having an opening therein defined by an underturned edge and a fender skirt for closing said opening having a marginal portion for abutting the front face of said fender in proximity to said underturned edge, a flange extending rearwardly through said opening, and a rearwardly extending base flange; means for detachably securing said skirt in desired assembled position on said fender comprising a clamping arm having a portion for hooking over said underturned edge of said fender, a clamping bolt having a head and a threaded end, and means at the lower end of said clamping arm for complementary engagement with the threaded end of said bolt, said base flange being cut back in a central portion thereof for the reception of said bolt and to permit lateral movement of said bolt into assembled position on said fender.

3. A clamping mechanism for a fender skirt of the type having a rearwardly extending base flange comprising a fender engaging supporting member, a clamping member carried by said base flange and engageable with said supporting member for exerting an upward pull on said skirt, said base flange being slotted to permit lateral removal of said clamping member therefrom, and means for restraining lateral movement of said clamping member.

4. A clamping mechanism for a fender skirt of the type having a rearwardly extending base flange comprising a fender engaging supporting member, a clamping member carried by said base flange and engageable with said supporting member for exerting an upward pull on said skirt, said base flange having a transverse slot therein terminating at the rear edge thereof adapted to receive said clamping member, and means for preventing lateral movement of said clamping member when said skirt is held in assembled position on a vehicle fender.

5. A clamping mechanism for a fender skirt of the type having a rearwardly extending base flange comprising a fender engaging supporting member, a clamping member carried by said base flange and engageable with said supporting member for exerting an upward pull on said skirt, said base flange having a transverse slot therein terminating at the rear edge thereof and at least one aperture in proximity to the slot, and a plate member carried by said clamping member having a protuberance thereon for disposition in said aperture of said base flange whereby lateral movement of said clamping member is restrained.

6. A fender skirt having a rearwardly extending base flange, an L-shaped angle iron secured to said flange and having an upstanding wall based from said skirt, a collar secured to said upstanding wall, said base flange and said angle iron being apertured opposite the lower end of said collar, a clamping bolt having a head disposed on the underside of said base flange and a threaded shank extending upwardly through said aperture and said collar, means on said bolt engageable with the upper end of said collar for holding said bolt in desired vertical position, and a fender skirt supporting member having a threaded recess for complementary engagement with the threaded shank of said bolt.

7. A fender skirt for disposition on a vehicle fender having an underturned curled edge, said fender skirt having a rearwardly extending base flange, an L-shaped angle iron secured to said flange and having an upstanding wall and a bottom wall, said angle iron being of a length to extend beyond both ends of said skirt, and said bottom wall of said angle iron being cut back a substantial distance at both ends thereof to permit extension therethrough of said curled edge of said fender, whereby said angle iron is adapted to center said skirt as it is mounted on said fender.

8. A fender skirt for disposition on a vehicle fender having an underturned marginal portion which defines a wheel opening, said skirt having a rearwardly extending flange adapted to be seated on said underturned marginal portion of said fender, a clamping mechanism for detachably supporting said skirt on said fender carried by said skirt including a single clamping rod having a curved intermediate portion shaped to be seated in said underturned marginal portion of said fender and radially inwardly extending arms, and means carried by said fender skirt for exerting a downward pull on the inner ends of said arms, said rearwardly extending flange of said fender skirt having a transverse slot therein terminating at the rear edge thereof opposite said radially inwardly extending arms to permit disposition of said arms therein.

GROVER C. PATRICK.
GEORGE W. SCHATZMAN.